(12) United States Patent
Srivastava

(10) Patent No.: US 10,021,130 B2
(45) Date of Patent: Jul. 10, 2018

(54) NETWORK STATE INFORMATION CORRELATION TO DETECT ANOMALOUS CONDITIONS

(71) Applicant: Verizon Patent and Licensing Inc., Arlington, VA (US)

(72) Inventor: Ashok N Srivastava, Mountain View, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 214 days.

(21) Appl. No.: 14/868,158

(22) Filed: Sep. 28, 2015

(65) Prior Publication Data
US 2017/0093907 A1    Mar. 30, 2017

(51) Int. Cl.
*H04L 29/06* (2006.01)
*H04L 12/24* (2006.01)

(52) U.S. Cl.
CPC .......... *H04L 63/1458* (2013.01); *H04L 41/12* (2013.01); *H04L 63/1416* (2013.01)

(58) Field of Classification Search
CPC . H04L 63/1458; H04L 62/1416; H04L 41/12; H04L 29/06911; H04L 29/06925; H04L 29/06931; H04L 29/06938; G06F 21/55
USPC .......................................................... 726/23
See application file for complete search history.

(56) References Cited

U.S. PATENT DOCUMENTS

| | | | | |
|---|---|---|---|---|
| 6,600,735 B1 * | 7/2003 | Iwama | ................ | H04M 7/1285 370/241 |
| 6,628,606 B1 * | 9/2003 | Hong | .................. | H04L 27/2659 370/208 |
| 7,006,435 B1 * | 2/2006 | Davies | .................. | H04L 1/0001 370/230 |
| 7,131,037 B1 * | 10/2006 | LeFaive | .............. | H04L 41/0631 714/46 |
| 7,389,537 B1 * | 6/2008 | Callon | .................... | H04L 47/10 713/153 |
| 7,573,866 B2 * | 8/2009 | Nikolova | ................ | H04L 45/12 370/229 |
| 7,584,507 B1 * | 9/2009 | Nucci | .................. | H04L 63/1416 726/22 |
| 7,836,201 B2 * | 11/2010 | Kotrla | ................. | H04L 41/0896 709/203 |
| 8,064,391 B2 * | 11/2011 | Kozisek | .............. | H04L 41/0823 370/219 |
| 8,438,644 B2 * | 5/2013 | Watters | ................ | G06F 21/577 705/51 |

(Continued)

FOREIGN PATENT DOCUMENTS

WO    WO/2013027970    *  2/2013    ......... H04L 64/1408

*Primary Examiner* — Eleni A Shiferaw
*Assistant Examiner* — Shahriar Zarrineh

(57) ABSTRACT

State information relating to the operation of network devices is used to identify network issues and/or anomalies relating to the operation of the network. The state information from the network devices may include time-series signals from a number of network devices. Correlation values may be obtained between pairs of time-series signals. Pairs of time-series signals that have a relatively high correlation value may be determined to be related to one another. In one implementation, mitigation of the network issues/anomalies may be automatically performed based on calculated correlation values.

15 Claims, 10 Drawing Sheets

(56) References Cited

U.S. PATENT DOCUMENTS

| | | | |
|---|---|---|---|
| 8,639,797 B1* | 1/2014 | Pan | H04L 43/04 709/223 |
| 9,141,789 B1* | 9/2015 | Gerlach | G06F 21/55 |
| 9,599,531 B1* | 3/2017 | Chaudhary | G01M 3/2807 |
| 9,659,376 B2* | 5/2017 | Ono | G06T 7/223 |
| 9,699,211 B2* | 7/2017 | Jain | H04L 63/1458 |
| 2003/0035374 A1* | 2/2003 | Carter | H04L 45/00 370/235 |
| 2003/0084328 A1* | 5/2003 | Tarquini | G06F 21/552 726/23 |
| 2003/0097439 A1* | 5/2003 | Strayer | H04L 63/1408 709/224 |
| 2003/0218987 A1* | 11/2003 | Loader | H04L 47/12 370/252 |
| 2004/0088406 A1* | 5/2004 | Corley | H04L 41/064 709/224 |
| 2004/0114519 A1* | 6/2004 | MacIsaac | H04L 43/00 370/232 |
| 2006/0010389 A1* | 1/2006 | Rooney | H04L 63/1425 715/736 |
| 2006/0067240 A1* | 3/2006 | Kim | H04L 41/142 370/242 |
| 2006/0140313 A1* | 6/2006 | Futami | H04L 1/001 375/343 |
| 2006/0203894 A1* | 9/2006 | Ventola | H04B 1/7093 375/148 |
| 2006/0288411 A1* | 12/2006 | Garg | H04L 63/0236 726/22 |
| 2007/0206498 A1* | 9/2007 | Chang | H04L 43/045 370/232 |
| 2007/0209068 A1* | 9/2007 | Ansari | H04L 45/00 726/13 |
| 2007/0280114 A1* | 12/2007 | Chao | H04L 43/0888 370/235.1 |
| 2009/0154350 A1* | 6/2009 | Diab | H04L 47/10 370/235 |
| 2009/0175299 A1* | 7/2009 | Hosokawa | H04L 7/042 370/503 |
| 2009/0238077 A1* | 9/2009 | Bajpay | H04L 41/0681 370/241 |
| 2009/0265784 A1* | 10/2009 | Waizumi | H04L 63/1458 726/23 |
| 2010/0135157 A1* | 6/2010 | Kim | H04L 43/00 370/232 |
| 2010/0150008 A1* | 6/2010 | Sohn | H04L 41/22 370/252 |
| 2010/0191526 A1* | 7/2010 | Morii | G10L 19/107 704/219 |
| 2010/0216451 A1* | 8/2010 | De Pasquale | H04L 45/00 455/423 |
| 2010/0220619 A1* | 9/2010 | Chikira | H04L 43/00 370/252 |
| 2010/0290346 A1* | 11/2010 | Barford | H04L 41/064 370/242 |
| 2010/0296402 A1* | 11/2010 | Fraccalvieri | H04L 47/10 370/252 |
| 2011/0243029 A1* | 10/2011 | Mack-Crane | H04L 43/0888 370/253 |
| 2013/0064096 A1* | 3/2013 | Degioanni | H04L 67/1097 370/241 |
| 2014/0006861 A1* | 1/2014 | Jain | G06Q 30/01 714/26 |
| 2014/0279795 A1* | 9/2014 | Shibuya | G05B 23/0254 706/46 |
| 2015/0026800 A1* | 1/2015 | Jain | H04L 63/1458 726/22 |
| 2015/0281028 A1* | 10/2015 | Akhter | H04L 43/0858 370/252 |
| 2015/0304346 A1* | 10/2015 | Kim | H04L 63/1408 726/23 |
| 2016/0036837 A1* | 2/2016 | Jain | H04L 63/1458 726/23 |
| 2017/0061041 A1* | 3/2017 | Kumar | G06F 17/5009 |

* cited by examiner

| Router | Interface | Traffic Throughput | Timestamp |
|---|---|---|---|
| router1 | 100 | 0.7 | 7/20/2015 8:00:00 am |
| router1 | 100 | 0.8 | 7/20/2015 8:01:00 am |
| router1 | 101 | 0.5 | 7/20/2015 8:00:00 am |
| router2 | 100 | 0.9 | 7/20/2015 8:00:00 am |
| router2 | 110 | 0.5 | 7/20/2015 8:00:00 am |
| ••• | ••• | ••• | ••• |

410 → Router
420 → Interface
430 → Traffic Throughput
440 → Timestamp
400

Fig. 4

NETWORK STATE INFORMATION CORRELATION TO DETECT ANOMALOUS CONDITIONS

BACKGROUND

Networks, such as telecommunications networks, may be implemented using a number of different types of network devices, such as routers, gateways, control and management servers, and other types of devices. The network devices may transmit state information to a network management center. The state information may include alarms that may indicate potential problems or issues at the network device, data that indicates operational conditions of the network device (e.g., traffic load at a particular interface of the network device, the temperature of the network device, etc.), or other data.

It can be important for the network management center to be able to promptly and accurately recognize, based on the state information, network issues. The network management center may then, for example, take action to mitigate the detected issues.

BRIEF DESCRIPTION OF THE DRAWINGS

FIG. 4 illustrates an example data structure;

DETAILED DESCRIPTION OF PREFERRED EMBODIMENTS

The following detailed description refers to the accompanying drawings. The same reference numbers in different drawings may identify the same or similar elements.

Techniques described herein relate to the automatic analysis of state information from network devices to identify network issues and/or anomalies relating to the operation of the network. The state information from the network devices may include time-series signals from a number of network devices. A correlation value may be obtained between pairs of time-series signals. Pairs of time-series signals that have a relatively high correlation value may be determined to be related to one another. The network devices corresponding to the correlated time-series signals may be identified as network devices that may be involved with the network issue or anomaly.

In one implementation, mitigation of the network issues/anomalies may be automatically performed based on the identified network devices. For example, when the network devices are routers and the state information includes traffic throughput measurements at various interfaces of the routers, the correlation values may be used to identify particular router interfaces that are the subject of a network attack, such as a Distributed Denial of Service (DDoS) attack. Traffic parameters relating to the router interfaces, which are the subject of the DDoS attack, may then be automatically adjusted to mitigate the attack.

Figure 1:
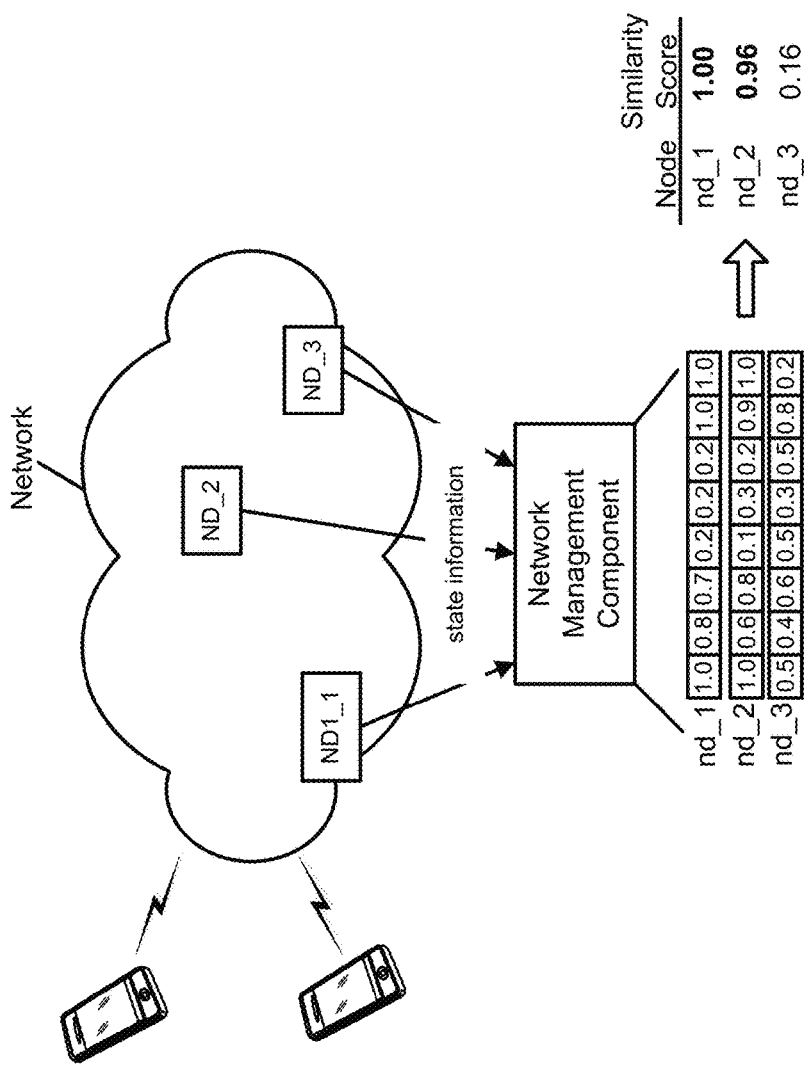
FIG. 1 is a diagram illustrating an example of an overview of concepts described herein.

FIG. 1 is a diagram illustrating an example of an overview of concepts described herein. As illustrated, a network may be implemented using a number of network devices, labeled as network device 1 (ND_1), network device 2 (ND_2), and network device 3 (ND_3). The network devices may include, for example, routers, switches, gateways, or other devices. The network devices may transmit state information to a network management component. The state information may include data that reports the operational state of the network device and/or information relating to alarm or abnormal operation of the network device. For a router, for example, the router may transmit measurements of the throughput (i.e., the network traffic load) on particular interfaces of the router.

The network management component may aggregate the state information from the network devices. The state information may be maintained or constructed as a time-series signal (i.e., a sequence of data points made over time). In the example illustrated in FIG. 1, the state information is illustrated as throughput measurements for the network devices. The throughput measurements are shown normalized to a value between 0.0 (no traffic load) and 1.0 (maximum traffic load). For instance, for nd_1, the throughput measurements for eight periodic samples (e.g., throughput measurements each made 10 seconds (or another value) apart) are: 1.0, 0.10, 0.7, 0.2, 0.2, 0.2, 1.0, and 1.0. These throughput measurements thus define a time-series signal. Corresponding throughput measurements (e.g., at the same or approximately the same sampling time) are also illustrated for nd_2 and nd_3.

Consistent with aspects described herein, the network management component may calculate correlation values between the time-series signals. For example, in response to the determination that nd_1 is experiencing high load, the network management device may calculate the correlations between the time-series signal associated with nd_1 and the time-series signal associated with each of the other network devices. The resultant values, which are referred to as similarity scores in FIG. 1, may be sorted and presented in descending order with respect to nd_1. Thus, as illustrated, the correlation between the time-series signal associated with nd_1 and nd_2 is 0.96, and the correlation between the time-series signal associated with nd_1 and nd_3 is 0.16. The high correlation between nd_1 and nd_2 (0.96) may indicate that the network issue that is affecting nd_1 may also be affecting nd_2.

In some implementations, the similarity scores may be output, in a textual or graphical manner, to a human operator for analysis. The similarity scores may be sorted to allow the human operator to quickly identify the network devices that are likely to be involved in the network anomalies. In situations where the number of time-series signals is large (e.g., hundreds or thousands), the similarity scores may allow the operator to recognize the particular network devices that are associated with the network anomaly from a large data set that may otherwise appear to be relatively randomly distributed and/or contain a low signal to noise (SNR) component.

In some implementations, the network management component (or another network element) may use the similarity scores to automatically react to the network anomalies. For example, as previously mentioned, when the network devices include routers, the similarity scores may be used to identify a set of routers that are experiencing a DDoS attack. Parameters associated with the routers may automatically be adjusted, such as to drop a portion of the traffic on the affected router interfaces and/or to change routing paths of the traffic in the network.

Figure 2:
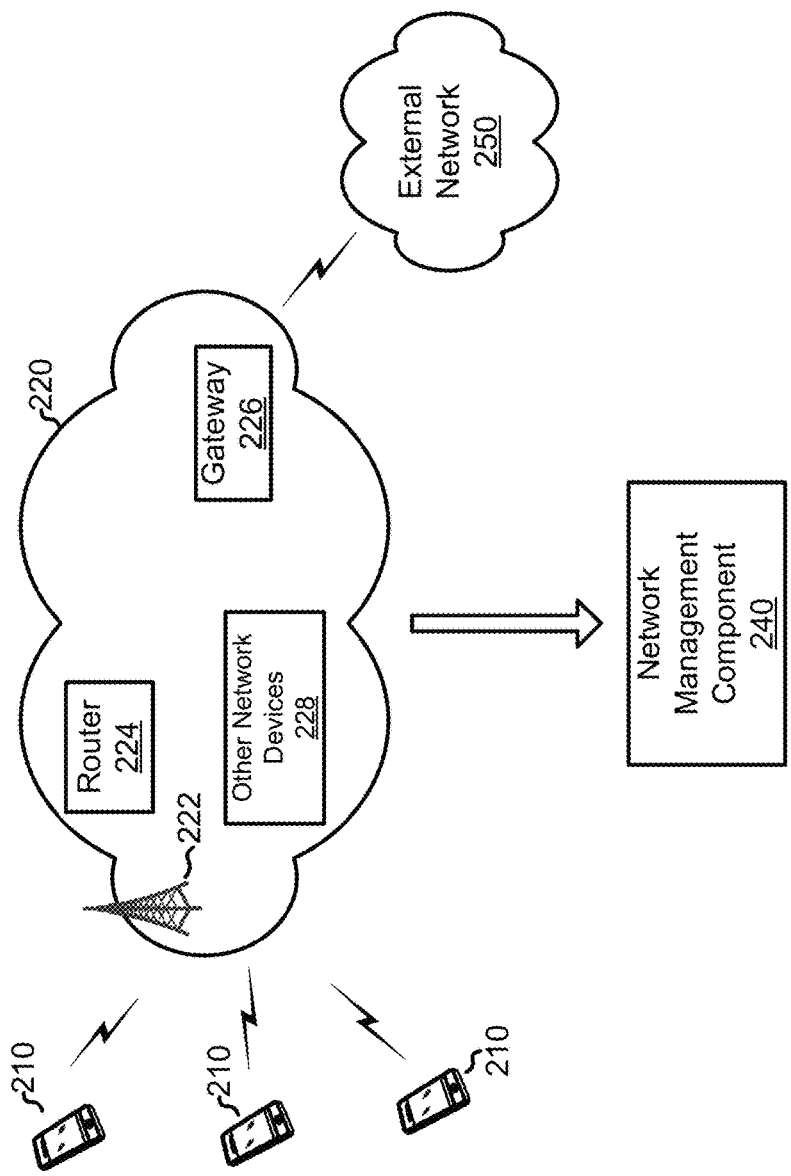
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more mobile devices 210 (referred to individually as "mobile device 210" and collectively as "mobile devices 210"), network 220, network management component 240, and external network 250.

Mobile devices 210 may each include a portable computing and communication device, such as a personal digital assistant (PDA), a smart phone, a cellular phone, a smartwatch, a laptop computer with connectivity to a cellular wireless network, a tablet computer, etc. Mobile device 210 may also include non-portable computing devices, such as desktop computers, consumer or business appliances, or other devices that have the ability to connect to network 220.

Network 220 may represent a wireless network (e.g., a wireless cellular network), and/or a wired network, through which mobile devices 210 and external network 250 communicate. Network 220 may include a wide area network ("WAN"), a metropolitan area network ("MAN"), a radio access network ("RAN"), the Internet, a fiber optic-based network, and/or a combination of these or other types of networks. In one implementation, network 220 may include a wireless network that is implemented based on the Long Term Evolution ("LTE") standard. In other implementations, network 220 may include a wireless network implemented based on other standards, such as a Code Division Multiple Access ("CDMA") 2000 1× network, a second generation ("2G") wireless network, a third generation ("3G") wireless network, a fifth generation ("5G") wireless network, a "Wi-Fi" wireless network (e.g., a network that operates according to an Institute of Electrical and Electronics Engineers ("IEEE") 802.11 standard), and/or another wireless network. In some implementations, network 220 may be communicatively coupled to one or more other networks, such as external network 250.

Network 220 may include a number of network devices that collectively implement the functionality of the network. A number of types of network devices are illustrated in FIG. 2, including: base station 222, router 224, and gateway 226. This list of network devices is non-exclusive. Other network devices, such as servers used to implement control functions for network 220, are generally illustrated as other network devices 228.

Base station 222 may include one or more network devices that receive, process, and/or transmit traffic, such as calls, audio, video, text, and/or other data, destined for and/or received from mobile devices 210. In the context of a Long Term Evolution (LTE) network, base station 222 may be referred to as an Evolved NodeB (eNB). Base station 222 may receive traffic from and/or send traffic to, via an air (i.e., radio) interface, mobile devices 210. Possible state information, that may be generated by base station 222, includes traffic throughput at the air interfaces of the base station, internal queue load, alarm conditions generated by base station 222, or other information.

Router 224 may include a network device that provides routing and switching functions for network 220. In general, network 220 may include a large number of routers 224. Each router 224 may be associated with a number of physical interfaces or logical interfaces, which may be generally referred to as "interfaces" herein. A physical interface may correspond to a physical cable or of router 224. A physical interface may carry a number of logical interfaces or a logical interface may be split across multiple physical interfaces. Router 224 may periodically or intermittently transmit state information to network management component 240. In one implementation, the state information may include indications of traffic load (e.g., throughput) at the interfaces of router 224. Based on the reception of multiple traffic throughput measurements, network management component 240 may be able to construct a time-series signal, for each interface of router 224, that represents the change in traffic load with respect to time.

Gateway 226 may include may include one or more devices that act as the point of interconnect between the network 220 and external network 250. Gateway 226 may route packets to and from the mobile devices 210 and external network 250. Possible state information, that may be generated by gateway 226, includes traffic throughput at the interfaces of the gateway, alarm conditions generated by the gateway, or other information.

Other network devices 228 may include network control servers, authentication servers, user management servers, or other network devices. Other network devices 228 may potentially also generate state information.

Network management component 240 may include one or more computing devices, potentially geographically distributed, that provide network management and/or monitoring services for network 220. Network management component 240 may, for example, receive and store state information from network devices. Network management component 240 may construct or otherwise maintain the state information as time-series signals, where each time-series signal may represent a particular network metric or key performance indicator. As will be described in more detail below, network management component 240 may perform a correlation-based analysis, of the time-series signals, to detect network anomalies and/or issues and to identify particular network devices (or particular network device interfaces) that are involved in the anomalies. Although illustrated, in FIG. 2, as being separate from network 220, in some implementations, network management component 240 may itself be implemented as a part of network 220.

External network 250 may include 260 may include a wide area network (WAN), a metropolitan area network (MAN), the Internet, a fiber optic-based network, and/or a combination of these or other types of networks. External network 250 may be a packet-based network, such as the Internet.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200.

Figure 3:
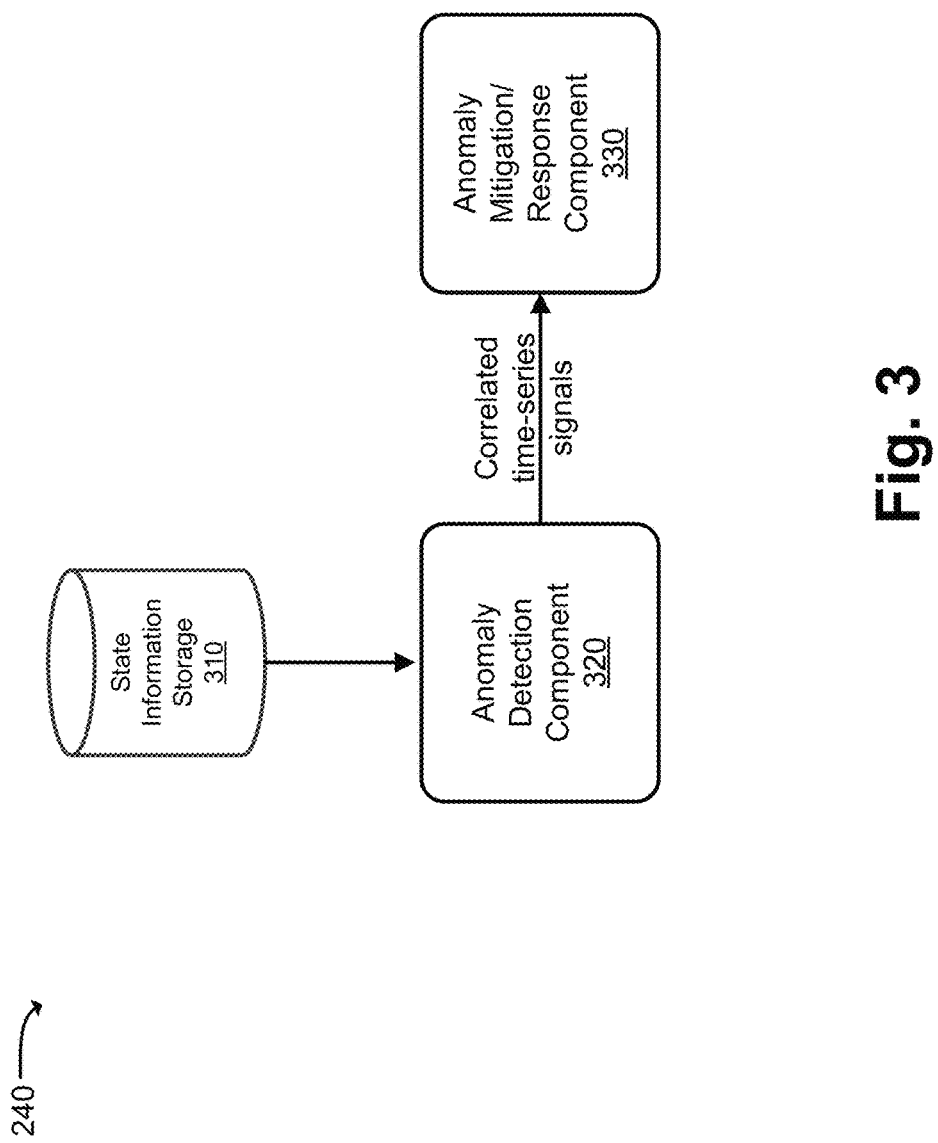
FIG. 3 is a diagram illustrating example functional components of the network management component illustrated in FIG. 2.

FIG. 3 is a diagram illustrating example functional components of network management component 240, in accordance with some implementations. As shown, network management component 240 may include state information storage component 310, anomaly detection component 320, and anomaly mitigation/response component 330.

State information storage component 310 may represent a database or other storage device or process that is used to store the state information received from the network devices. The state information may be stored as time-series signals or as data from which the time-series signals can be derived. Each time-series signal may represent a particular network measurement or performance indicator for a particular network device. In the situation in which traffic throughput, associated with network traffic, is stored by state information storage component 310, time-series signals may be maintained for interfaces of routers in network 220.

Anomaly detection component 320 may include one or more computing devices that receive, from state information storage component 310, the time-series signals, and analyze the time-series signals. The result of the analysis may include an indication of the time-series signals (and/or the corresponding network devices) that are correlated with one another. The operation of anomaly detection component 320 will be described in more detail below.

Anomaly mitigation/response component 330 may include one or more computing devices that receive and act upon the output of anomaly detection component 320. In one implementation, anomaly mitigation/response component 330 may, based on the correlated time-series signals, automatically or semi-automatically act to mitigate anomalies, issues, or attacks associated with network 220. For example, anomaly mitigation/response component 330 may transmit instructions to the network devices in order to modify parameters or otherwise control the network devices. The operation of anomaly mitigation/response component 330 will be described in more detail below.

FIG. 4 illustrates an example data structure 400 that may be stored by state information storage component 310. In this example, data structure 400 will be described as storing traffic throughput measurements for routers 224.

As illustrated, data structure 400 may include a number of fields, including: router field 410, interface field 420, traffic throughput field 430, and timestamp field 440. Each row in data structure 400 may represent a single sample of state information that was received by network management component 240. The fields shown for data structure 400 are examples. In alternative possible implementations, different, fewer, or additional fields may be implemented.

Router field 410 and interface 420 may collectively define the particular router and interface for a received traffic throughput measurement. Timestamp field 440 may store the date/time at which the traffic throughput measurement was measured. For example, the first row of data structure 400 may correspond to a traffic throughput measurement that was received, at 8:00 am on Jul. 20, 2015, from interface "100" of the router labeled as "router1." Similarly, the second row of data structure 400 may correspond to a traffic throughput measurement, from the same router and interface, but at a later time (8:01 am on Jul. 20, 2015). The third row of data structure 400 may correspond to a traffic throughput measurement that was received, at 8:00 am on Jul. 20, 2015, from interface "101" of the router labeled as "router1."

Traffic throughput field 430 may store the value of the received traffic load measurements. In data structure 400, the traffic throughput values are illustrated as normalized values in the range 0.0 to 1.0, where a value of 0.0 indicates no traffic load and a value of 1.0 indicates high or maximum traffic load. In other implementations, other formats for the traffic throughput measurements may be used. For example, the raw measured throughput value (e.g., in bits per second), may be stored.

Figure 5:
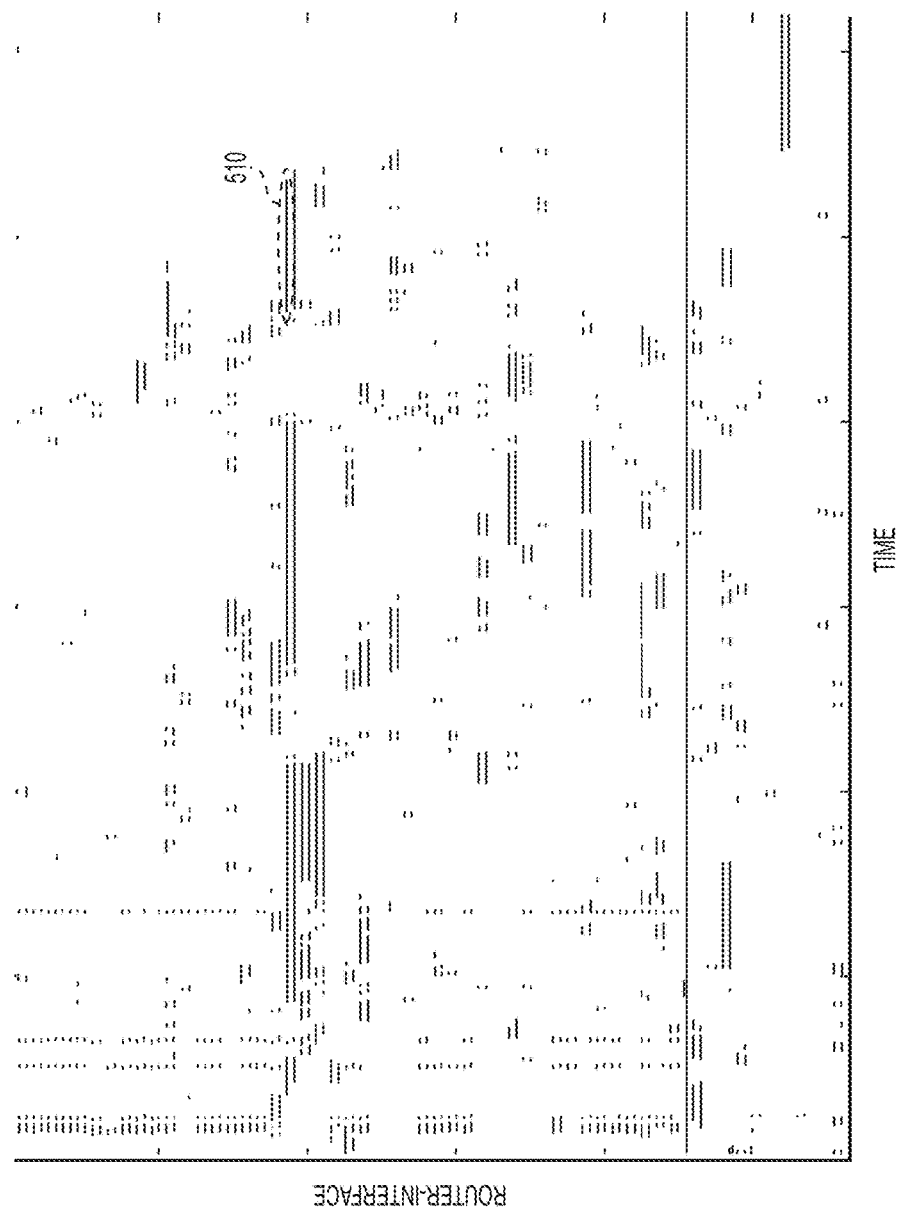
FIG. 5 is a graphical diagram illustrating an example of throughput measurements, shown as time-series signals, for routers.

In FIG. 4, relatively few traffic throughput measurements are illustrated. In a real-world scenario, the amount of data associated with the throughput measurements, for a network, can be substantial. For example, network 220 may include on the order of hundreds of thousands of routers 224, and each router 224 may include on the order of hundreds of interfaces. FIG. 5 is a graphical diagram illustrating an example of throughput measurements, shown as time-series signals, for routers 224.

In FIG. 5, time is illustrated on the horizontal axis. Each row in FIG. 5 may correspond to a particular router and interface combination. Thus, each row may represent a time-series signal of throughput for a particular router and interface. Each "dot" in FIG. 5 may represent a single throughput measurement, where darker dots are used to indicate higher load. Long segments of dark dots, such as those illustrated within semicircle 510, may thus illustrate sustained periods of high throughput. As can be seen in FIG. 5, for a large number of routers, interfaces, and throughput samples, visually or manually determining anomalies in network 220, and the routers/interfaces that are associated with the anomalies, can be a difficult task.

Figure 6:
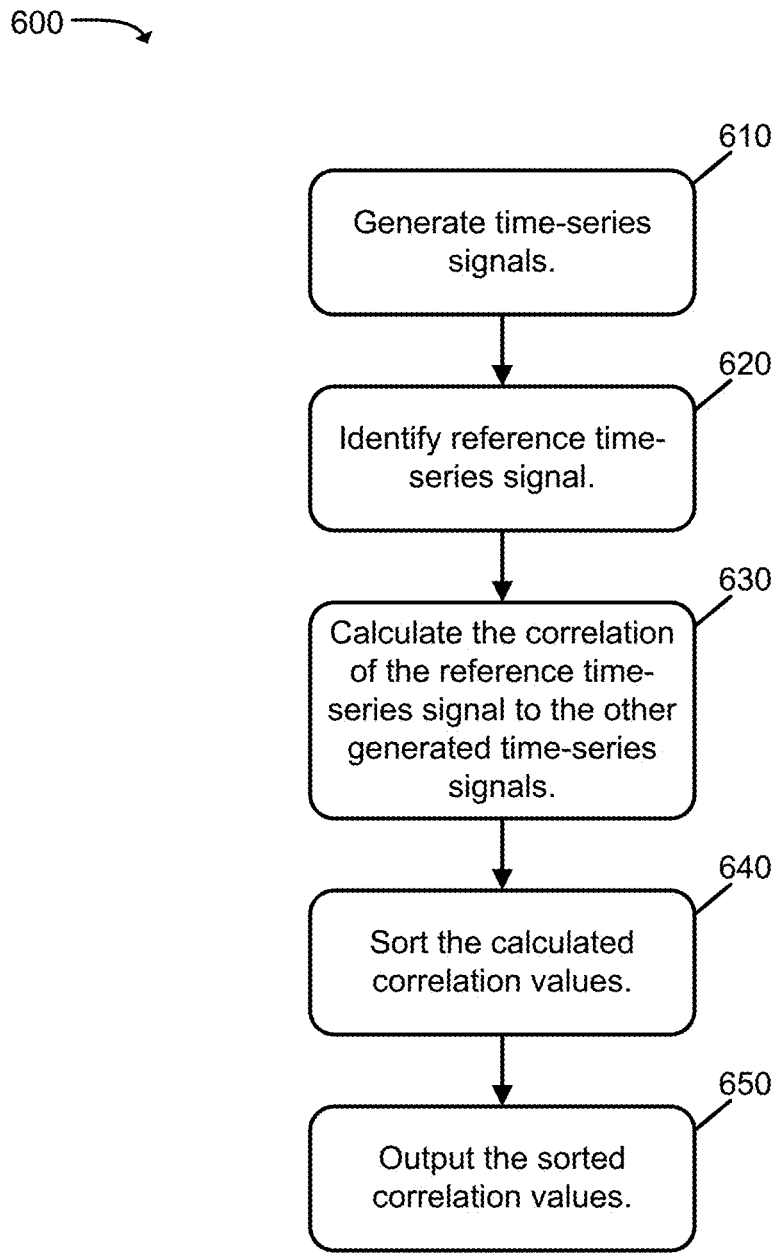
FIG. 6 is a flowchart illustrating an example process relating to the operation of the anomaly detection component shown in FIG. 3.

FIG. 6 is a flowchart illustrating an example process 600 relating to the operation of anomaly detection component 320 in detecting and/or identifying network anomalies and network devices associated with the anomalies.

Process 600 may include generating the time-series signals (block 610). As previously mentioned, the time-series signals may include a number of time-series signals that are generated from the state information. The time-series signals may be associated with a particular network metric or performance indicator (e.g., throughput at the interfaces of the network devices). In one implementation, the time-series signals may be generated from the "raw" data in data structure 400.

Process 600 may further include identifying a reference time-series signal (block 620). The reference time-series signal may be a signal that matches a particular pattern or that has an average magnitude greater or less than a threshold. For example, for an implementation in which alerts are generated based on detection of high levels of traffic, such as in the detection and mitigation of DDoS attacks, the identified reference time-series signal may be the time-series signal that exhibits the highest average throughput value over the time series, the highest maximum throughput value over the time series, the time-series signal in which the average throughput value over the time series is greater than a threshold, etc. In some implementations, the reference time-series signal may be a time-series signal corresponding to a network device in which an alarm (e.g., very high levels of traffic) has been generated by the network device. In other implementations, process 600 may iteratively process each time-series signal as a reference signal (i.e., blocks 620-640 may be repeated for each time-series signal).

Process 600 may further include calculating the correlation of the reference time-series signal to the other generated time-series signals (block 630). The correlation may be calculated as the "standard" correlation coefficient (also referred to as the Pearson product-moment correlation coefficient, a rank correlation coefficient (e.g., Spearman's rank correlation coefficient or Kendall tau rank correlation coefficient), or using another correlation technique. In some implementations, the calculated correlation coefficients may be normalized with respect to the total noise associated with the time-series signals. N−1 correlation coefficient values may be generated, where N is the number of time-series signals.

In some implementations, the calculated correlation values may be performed as a cross-correlation in which the a lagged version of the reference time-series signal or of the other time-series signals may be used when calculating the correlation value. For example, for a one time unit lag, the correlation of the reference signal may be calculated to the other time-series signals in which the other time-series signals are lagged (shifted) one time unit (e.g., one sample). Lag values other than one time unit may also be used. The amount of lag to use may be a configurable parameter (e.g., by a network administrator). With this technique, process 600 may identify network anomalies or issues that occur at different time offsets with respect to different router/interfaces.

Process 600 may further include sorting the calculated correlation values (block 640). The correlation values may be sorted in descending order. In this manner, the time-series signals that are most correlated with the reference time-series signal will be at the top of the sorted list of correlation values.

Process 600 may further include outputting the sorted correlation values (block 650). In one implementation, anomaly detection component 320 may output the sorted correlation values as a text-based list presenting, for one or more of the highest correlated time-series signals, the network device (e.g., router label and interface label) and the correlation coefficient value. In another implementation, the sorted correlation values may be presented graphically.

Figure 7:
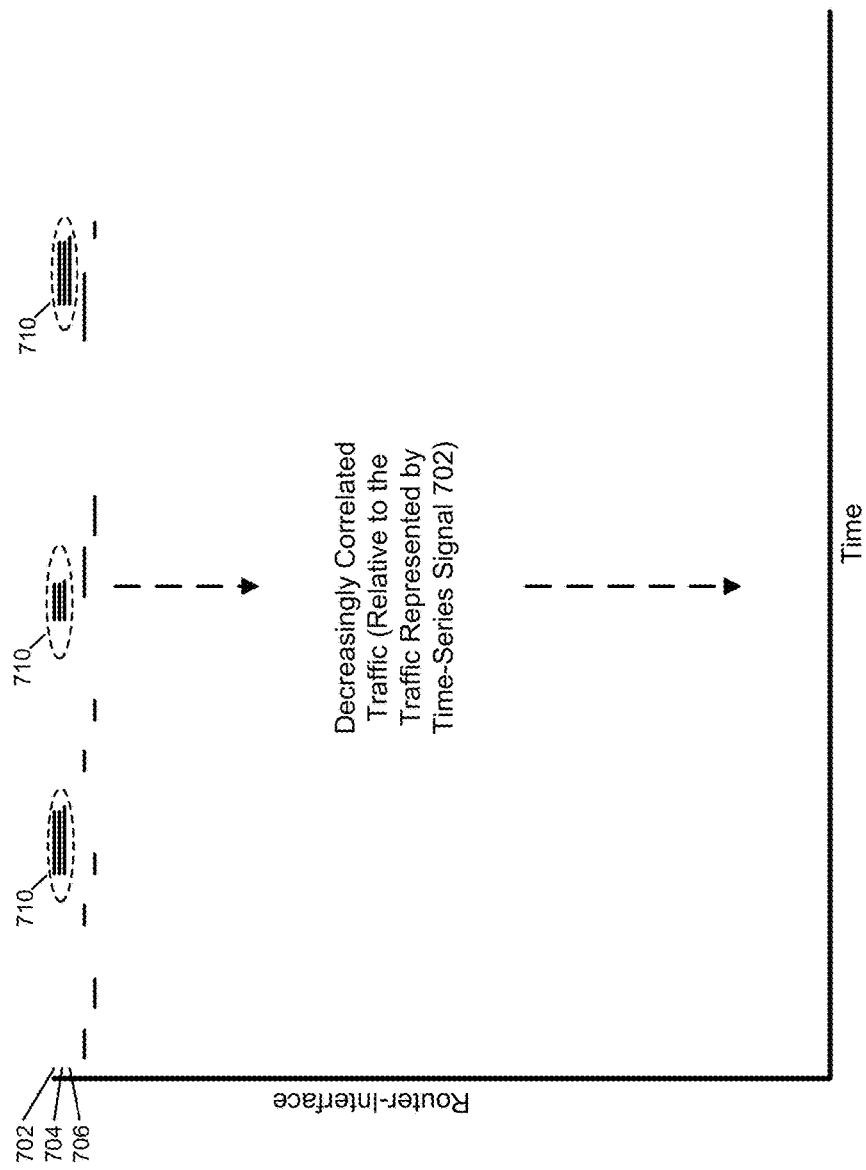
FIG. 7 is a diagram illustrating an example of a graphical representation of the output of the flowchart of FIG. 6.

FIG. 7 is a diagram illustrating an example of a graphical representation of the output of process 600. FIG. 7 may be similar to FIG. 5, except drawn so that the router and interface combinations (vertical axis) are arranged so that the highest correlation coefficient values are grouped together. For instance, the vertical axis (router and interface combination) may be arranged based on the sorted correlation values so that the reference time-series signal is placed at the top of the diagram and the next most highly correlated time-series signals are placed immediately below the reference time-series signal. For instance, as shown in FIG. 7, time-series signal 702 may correspond to the reference time-series signal, time-series signal 704 may correspond to the time-series signal that is most highly correlated with the reference time-series signal, time-series signal 706 may correspond to the time-series signal that is the next most highly correlated with the reference time-series signal, etc. In this manner, correlated network anomalies or attacks can be easily seen and analyzed by a user (e.g., a network technician). In particular, in FIG. 7, the correlation of attacks 710 may be easily seen.

In some implementations, blocks 620-640 may be repeated for different reference time-series signals. For example, each time-series signal may be assumed to be the reference time-series signal. Thus, the operations of blocks 620-640 may form for each of the reference time-series signals, and the "best" iteration taken as the final output. In this context, the "best" iteration may refer to the iteration that results in the highest average correlation coefficient values, the iteration in which the top 10 (or some other integer) correlation values are maximized, the iteration that has the highest number of correlation values above a threshold, or the iteration that is selected based on other criteria.

The operations of FIG. 6 assume no knowledge of network device connections (e.g., no knowledge of router interface connections). This can lead to computational complexity of $O(N^2)$, where N is the number of time-series signals (e.g., the number of router/interface combinations). In some implementations, network topology information can be used to reduce the computational complexity.

Figure 8:
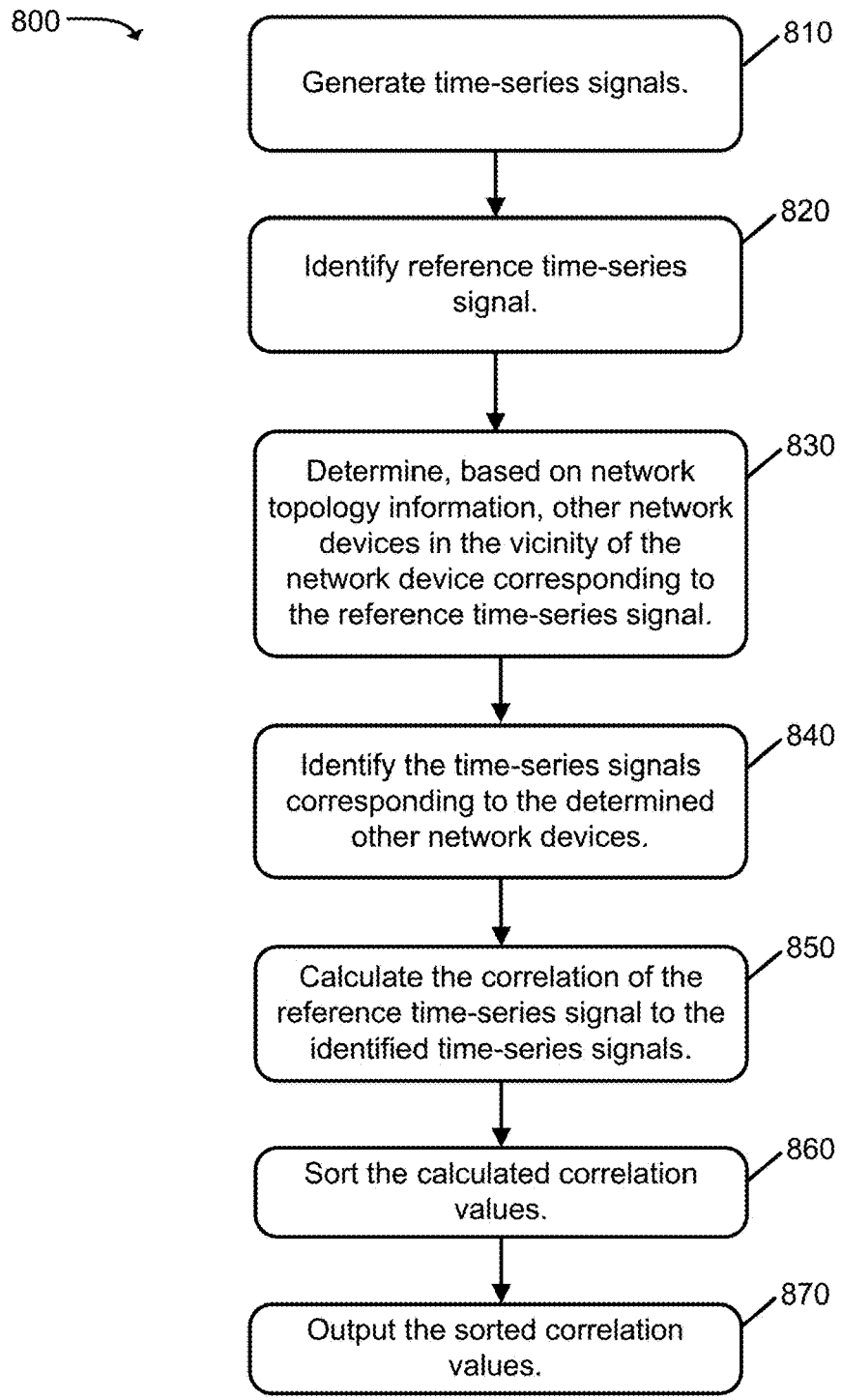
FIG. 8 is a flowchart illustrating another example process relating to the operation of the anomaly detection component shown in FIG. 3.

FIG. 8 is a flowchart illustrating an example process 800 relating to the operation of anomaly detection component 320 in detecting and/or identifying network anomalies using network topology information. A number of the blocks in FIG. 8 are similar to those in FIG. 6. For brevity, these operations will not again be discussed in detail.

Process 800 may include generating the time-series signals (block 810) and identifying a reference time-series signal (block 820).

Process 800 may further include determining, based on network topology information, other network devices in the vicinity of the network device corresponding to the reference time-series signal (block 830). Network topology information may include information defining the physical connections between the network devices. In some implementations, an estimate of network topology may be used in which the estimate is based on the geographical location of each of the network devices. The network topology information may be obtained based on static configuration by an administrator or automatically obtained by querying the network devices for the geographical location or the network connections associated with the network devices. Thus, the term "vicinity," in this context, may refer to the geographical vicinity of the network devices or vicinity based on the logical connections of the network devices. In one implementation, a first network device may be determined to be in the vicinity of a second network device when the geographical distance between the first network device and the second network device is below a threshold. Alternatively or additionally, a first network device may be determined to be in the vicinity of a second network device if the number of network hops between the first network device and the second network device is below another threshold.

Process 800 may further include identifying the time-series signals corresponding to the determined other network devices (block 840). For example, for the situation in which the network devices are routers, each router may include a number of interfaces, which may each correspond to a time-series signal. The time-series signals associated with the network device that corresponds to the reference time-series signal may also be included in the time-series signals identified in block 840. In this manner, selected pairs of time-series signals may be identified for use in calculating the correlation values. The number of time-series signals that are identified in block 840 may be significantly fewer than all of the available time-series signals for network 220.

Process 800 may further include calculating the correlation of the reference time-series signal to the identified time-series signals (block 850). In this manner, X−1 correlation coefficient values may be generated, where X is the number of identified time-series signals.

Process 800 may further include sorting the calculated correlation values (block 860). The correlation values may be sorted in descending order. In this manner, the time-series signals that are most correlated with the reference time-series signal will be at the top of the sorted list of correlation values. Process 800 may further include outputting the sorted correlation values (block 870). As previously mentioned, the anomaly detection component 320 may output the sorted correlation values as a text-based list or in a graphical manner.

Figure 9:
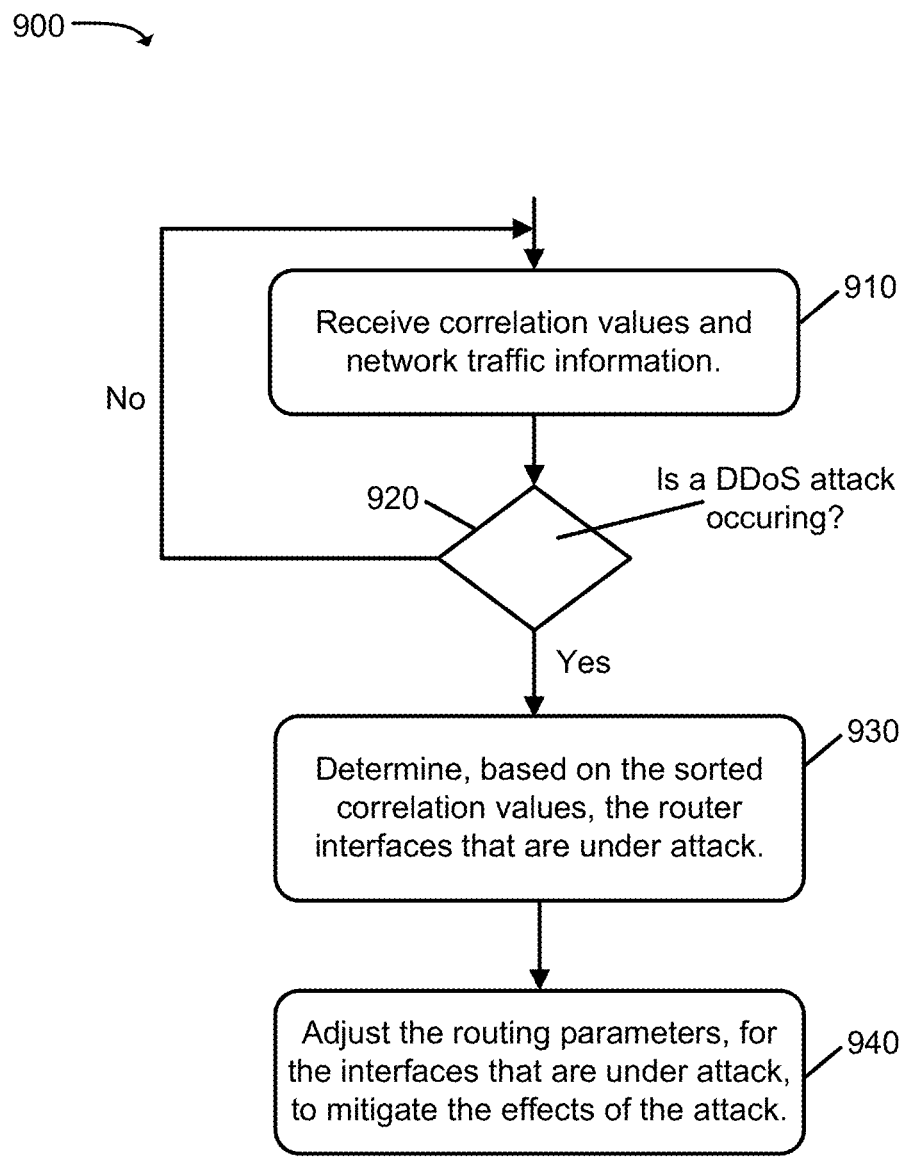
FIG. 9 is a flowchart illustrating an example process relating to the automatic mitigation of DDoS attacks.

As previously mentioned, the output of anomaly detection component 320 may be used to automatically mitigate network anomalies or attacks. FIG. 9 is a flowchart illustrating an example process 900 relating to the automatic mitigation of DDoS attacks using the output of anomaly detection component 320.

Process 900 may include receiving the correlation values and network traffic information (block 910). For example, anomaly mitigation/response component 330 may receive the sorted correlation values (e.g., generated via process 600 or 800) and the time-series signals (or other indications of traffic load in network 220).

Process 900 may further include determining whether a DDoS attack is occurring (block 920). Anomaly mitigation/ response component 330 may determine that a DDoS attack is occurring based on the network traffic information and/or based on the correlation values. For example, anomaly mitigation/response component 330 may detect the occurrence of a DDoS attack when a certain threshold number of router interfaces are at a threshold level of capacity for an extended period of time. In some implementations, the correlation values associated with the router interfaces may also be taken into account. For example, the occurrence of a DDoS attack may be determined when a certain threshold number of router interfaces are at a threshold level of capacity and the router interfaces are correlated, based on a particular correlation threshold, to a particular reference time-series signal (e.g., a reference time-series signal that is known to be associated with a DDoS attack). In other implementations, other techniques can be used to analyze the correlation values and/or network traffic information to automatically detect the occurrence of a DDoS attack.

Process 900 may further include determining, based on the sorted correlation values, the router interfaces that are under attack (block 930). In one implementation, the router interface corresponding to the selected reference time-series signal may be assumed to be under attack. A number of time-series signals, K, that are the most highly correlated to the reference time-series signal may also be assumed to correspond to network devices that are under attack, where K may be selected based on the throughput load of the corresponding interfaces and/or based on the correlation coefficient value to the reference time-series signal. For example, the K interfaces may be selected as the interfaces having an average traffic throughput value above a first threshold and a corresponding correlation value above a second threshold.

Process 900 may further include adjusting around parameters, for the interfaces that are determined to be under attack, to mitigate the effects of the DDoS attack (block 940). For example, anomaly mitigation/response component 330 may signal routers 224, associated with the determined interfaces, to drop a certain portion of the packets at the determined interfaces. In some implementations, only ingress interfaces (i.e., interfaces at the edge of network 220) may be controlled to drop packets. Alternatively or additionally, routing tables for routers 224 may be adjusted to more effectively route the DDoS traffic through network 220. Other parameters may be adjusted to mitigate or otherwise handle the DDoS attacks.

Figure 10:
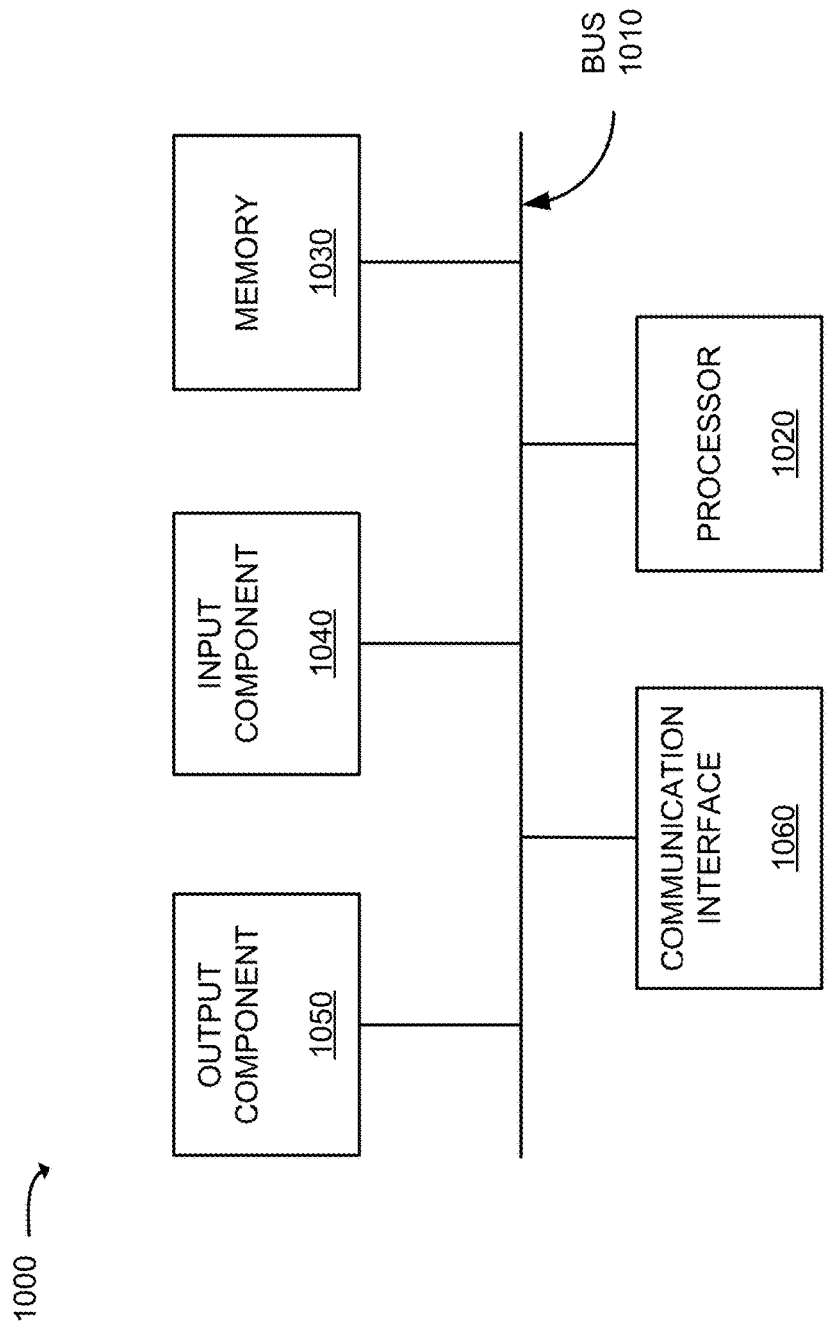
FIG. 10 is a diagram of example components of an example device.

FIG. 10 is a diagram of example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 6, 8, and 9, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device comprising:
   a non-transitory computer-readable medium containing program instructions; and
   one or more processors to execute the program instructions to:
   receive state information, from a plurality of network router devices, the state information corresponding to traffic throughput measurements at interfaces of the plurality of network router devices;
   generate a plurality of time-series signals corresponding to the received state information;
   identify a reference time-series signal, from the plurality of time-series signals, as a time-series signal that corresponds to a particular network router device, of the plurality of network router devices, for which an alarm has been generated that indicates potential problems or issues with the particular network device;
   calculate a plurality of correlation values, each of the plurality of correlation values being calculated as a correlation between the reference time-series signal and one of the plurality of time-series signals that corresponds to one of the plurality of network router devices other than the particular network device;
   sort the calculated plurality of correlation values;
   identify, based on the sorted plurality of correlation values, one or more of the plurality of network router devices, in addition to the particular network router device, that are likely to also be associated with the potential problems or issues of the particular network device; and
   output an indication of the identified network router devices as network router devices that are likely to be undergoing an anomalous condition.

2. The device of claim 1, wherein identifying the reference time-series signal includes:
   determining when one of the plurality of time-series signals matches a pattern; and
   identifying the reference time-series signal as the time-series signal that matches the pattern.

3. The device of claim 1, wherein the sorting of the correlation values includes sorting the correlation values in descending order.

4. The device of claim 1, wherein the one or more processors are further to execute the program instructions to:
   determine network topology information corresponding to a network associated with the plurality of network devices; and
   determine, based on the network topology information, time-series signals that correspond to network devices, of the plurality of network devices, that are in the vicinity of the network device associated with the reference time-series signal,
   wherein the plurality of correlation values are calculated between the reference time-series signals and the time-series signals that are determined to correspond to the network devices in the vicinity of the of the network device associated with the reference time-series signal.

5. The device of claim 4, wherein the network topology information includes connections between the plurality of network devices.

6. The device of claim 4, wherein the network topology information includes information identifying geographical locations of the plurality of network devices.

7. The device of claim 1, wherein the device further comprises processing logic to:
identify, based on the calculated correlation values, interfaces of the routers that are under Distributed Denial of Service (DDoS) attack; and
adjust parameters corresponding to the routers to mitigate the effects of the DDoS attack.

8. A method, implemented by one or more computing devices, comprising:
receiving, by the one or more computing devices, state information, from a plurality of network router devices, the state information corresponding to traffic throughput measurements at interfaces of the plurality of network router devices;
generating, by the one or more computing devices, a plurality of time-series signals corresponding to the received state information;
identifying, by the one or more computing devices, a reference time-series signal, from the plurality of time-series signal, as a time-series signal that corresponds to a particular network router device, of the plurality of network router devices, for which an alarm has been generated that indicates potential problems or issues with the particular network device;
calculating, by the one or more computing devices, a plurality of correlation values, each of the plurality of correlation values being calculated as a correlation between the reference time-series signal and one of the plurality of time-series signals that correspond to one of the plurality of network router devices other than the particular network device;
sorting the calculated plurality of correlation values;
identifying, based on the sorted plurality of correlation values, one or more of the plurality of network router devices, in addition to the particular network router device, that are likely to also be associated with the potential problems or issues of the particular network device; and
outputting an indication of the identified network router devices as network router devices that are likely to be undergoing an anomalous condition.

9. The method of claim 8, wherein the sorting of the correlation values includes sorting the correlation values in descending order.

10. The method of claim 8, wherein the method further comprises:
identifying, based on the calculated correlation values, interfaces of the routers that are under Distributed Denial of Service (DDoS) attack; and
adjusting parameters corresponding to the routers to mitigate the effects of the DDoS attack.

11. A non-transient computer-readable medium containing program instructions for causing a computer to:
receive state information, from a plurality of network router devices, the state information corresponding to traffic throughput measurements at interfaces of the plurality of network router devices;
generate a plurality of time-series signals corresponding to the received state information;
identify a reference time-series signal, from the plurality of time-series signals, as a time-series signal that corresponds to a particular network router device, of the plurality of network router devices, for which an alarm has been generated that indicates potential problems or issues with the particular network device;
calculate a plurality of correlation values, each of the plurality of correlation values being calculated as a correlation between the reference time-series signal and one of the plurality of time-series signals that corresponds to one of the plurality of network router devices other than the particular network device;
sort the calculated plurality of correlation values;
identify, based on the sorted plurality of correlation values, one or more of the plurality of network router devices, in addition to the particular network router device, that are likely to also be associated with the potential problems or issues of the particular network device; and
output an indication of the identified network router devices as network router devices that are likely to be undergoing an anomalous condition.

12. The computer-readable medium of claim 11, wherein identifying the reference time-series signal includes:
determining when one of the plurality of time-series signals matches a pattern; and
identifying the reference time-series signal as the time-series signal that matches the pattern.

13. The computer-readable medium of claim 11, wherein the sorting of the correlation values includes sorting the correlation values in descending order.

14. The computer-readable medium of claim 11, wherein the program instructions further cause the computer to:
determine network topology information corresponding to a network associated with the plurality of network devices; and
determine, based on the network topology information, time-series signals that correspond to network devices, of the plurality of network devices, that are in the vicinity of the network device associated with the reference time-series signal,
wherein the plurality of correlation values are calculated between the reference time-series signals and the time-series signals that are determined to correspond to the network devices in the vicinity of the of the network device associated with the reference time-series signal.

15. The computer-readable medium of claim 11, wherein the network topology information includes connections between the plurality of network devices.

* * * * *